United States Patent [19]
Czech

[11] Patent Number: 4,562,303
[45] Date of Patent: Dec. 31, 1985

[54] DISC-TYPE INSULATOR WITH A CAST-IN ELECTRODE AND PROCESS FOR ITS MANUFACTURE

[75] Inventor: Franz Czech, Niederhasli, Switzerland

[73] Assignee: BBC Brown, Boveri & Company, Ltd., Switzerland

[21] Appl. No.: 585,843

[22] Filed: Mar. 2, 1984

[30] Foreign Application Priority Data

Mar. 4, 1983 [CH] Switzerland ................ 1190/83

[51] Int. Cl.⁴ ............... H01B 17/42; H01B 17/18; H02G 5/06
[52] U.S. Cl. .................... 174/142; 174/28; 264/279.1
[58] Field of Search ............... 174/16 B, 28, 21 C, 174/22 C, 99 B, 142; 264/271.1, 279.1

[56] References Cited

U.S. PATENT DOCUMENTS 3,652,778  3/1972  Sakai .................... 174/28

FOREIGN PATENT DOCUMENTS 51-122787  10/1976  Japan .................... 174/28
54-157287  12/1979  Japan .................... 174/28

Primary Examiner—Laramie E. Askin
Attorney, Agent, or Firm—Ostrolenk, Faber, Gerb & Soffen

[57] ABSTRACT

A disc-type insulator for enclosed high-voltage equipment includes a cast-in electrode which is segmented and which extends peripherally and concentrically with respect to the edge surface of the disc. The cast-in electrode is connected to contact electrodes by means of contact tongues, the contact electrodes bearing against a metal mounting ring. To avoid damage to the disc-type insulator, to the contact tongues, or to the cast-in electrode during shrinkage of the disc-type insulator, following its casting, or damage resulting from thermal stresses during operation, the cast-in electrode is divided into a plurality of electrode segments which follow one another in the peripheral direction. The contact tongues are formed of bent-over extensions of the electrode segments and are "S" shaped. The electrode segments are composed of aluminum sheet which may have a smooth surface. The contact electrodes are fastened to the mounting ring by means of bolts. During the manufacture of the disc-type insulator, the electrode segments are fixed in the casting mold, before the casting operation begins. The segments are fixed by fastening the contact electrodes to a portion of the casting mold. Each of the electrode segments, with the associated contact tongues and contact electrodes, may be manufactured from a single part which is appropriately bent into the desired final shape.

11 Claims, 4 Drawing Figures

DISC-TYPE INSULATOR WITH A CAST-IN ELECTRODE AND PROCESS FOR ITS MANUFACTURE

BACKGROUND OF THE INVENTION

The invention relates to a disc-type insulator with a cast-in electrode, which is designed to be used in enclosed high-voltage equipment. The cast-in electrode, which is convex-cambered towards the disc axis, extends along at least a portion of the periphery of the disc-type insulator, and is connected to contact electrodes which are located on the surface of the disc-type insulator, the connection being capable of conducting electricity.

Disc-type insulators are employed to retain a conductor, or a plurality of conductors, in the gas-filled interior of the enclosure, and, customarily, also for hermetically sealing of various portions of the enclosure. The cast-in electrode, which is connected to the enclosure via the contact electrodes in a manner such that electricity can be conducted, functions to prevent the occurrence of intense electrical fields at the anchorage point of the disc-type insulator in the enclosure. Corona discharges, which are otherwise impossible to prevent at a reasonable cost, which occur because of the unavoidable contact between conducting material and non-conducting materials possessing different dielectric constants (enclosure, disc-type insulator, insulating gas) are avoided by smoothing out the electric fields.

A disc-type insulator is described in U.S. Pat. No. 3,652,778. This disc-type insulator possesses a cast-in electrode which is designed as a continuous ring and which is connected to contact electrodes, by means of straight contact tongues, in a manner such that the connection conducts electricity. These contact electrodes serve at the same time as cast-in sleeves which carry threads.

In the case of a disc-type insulator, particularly one having a comparatively large diameter, it has been found that cast-in electrodes of the abovementioned design can easily be damaged and, in particular, distorted as a result of the shrinkage which occurs during the curing of the the disc-type insulating material after it has been cast, or as a result of thermal stressing during operation. Moreover, the contact tongues can be torn away, which can lead to the cast-in electrode becoming functionally unserviceable and, in consequence, to corona discharges and even to insulation breakdowns, or the insulator can break away from the cast-in electrode over a portion of the periphery.

SUMMARY OF THE INVENTION

It is an object of the invention to remedy the abovementioned disadvantages. As characterised in the claims, the invention achieves the object of providing a disc-type insulator with a cast-in electrode, in which the electrode and, likewise, the contact tongues exhibit so much flexibility, particularly in the radial direction, that they adjust themselves to the changes in the dimensions of the disc-type insulator during shrinkage. The electrode maintains its flexibility when under thermal stresses during operation, to an extent such that both the stresses at the interfaces between the insulator material and the electrode, and the pull acting on the contact tongues remain safely below critical values and thus damage is reliably prevented to any portion of the disc-type insulator. A simple and economical process for the manufacture of a disc-type insulator according to the invention is additionally specified.

The advantages of the invention reside, above all, in the fact that the occurrence of dangerous mechanical stresses in the disc-type insulator is prevented and, with this, the danger of the disc-type insulator being damaged as a result of stresses of this nature is effectively countered. This is achieved, in part, by dividing the electrodes into a plurality of segments.

However, the division of the cast-in electrode into a plurality of electrode segments also entails the advantage that the latter are easier to install, being, in particular, less sensitive to assembly tolerances, are cheaper to manufacture, and require less room during transportation and storage. They also render it possible to attach a cast-in electrode only over portions of the periphery, as in the case of, for example, enclosed 3-phase installations.

Moreover, the division of the cast-in electrode into segments enables the disc-type insulator to be manufactured by means of a simple process, irrespective of the casting process which is employed. In particular, the electrode segments can be fixed inside the casting mould before the casting operation by fastening them to the casting mould by means of the contact electrodes which are connected to them. Because the electrode segments and the contact tongues are flexible, it is also possible to carry out the operation of curing the disc-type insulator without first having to release this fastening.

Below the invention is explained in more detail by reference to drawings which illustrate merely one possible embodiment, and in which:

DETAILED DESCRIPTION OF PREFERRED EMBODIMENTS

Figure 1:
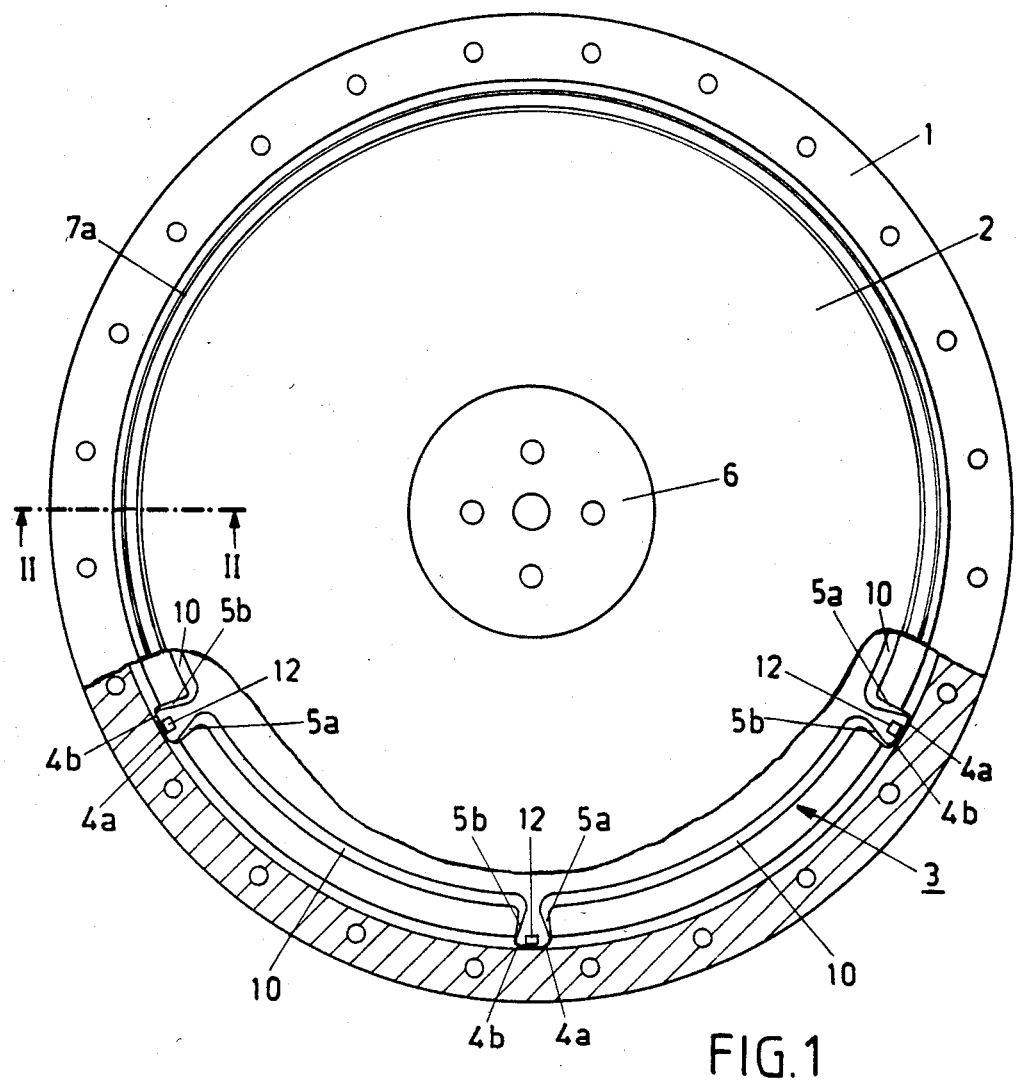
FIG. 1 shows a plan view of a disc-type insulator according to the invention, possessing a metal mounting ring, the cast-in electrode being exposed over a portion of the periphery.
Figure 2:
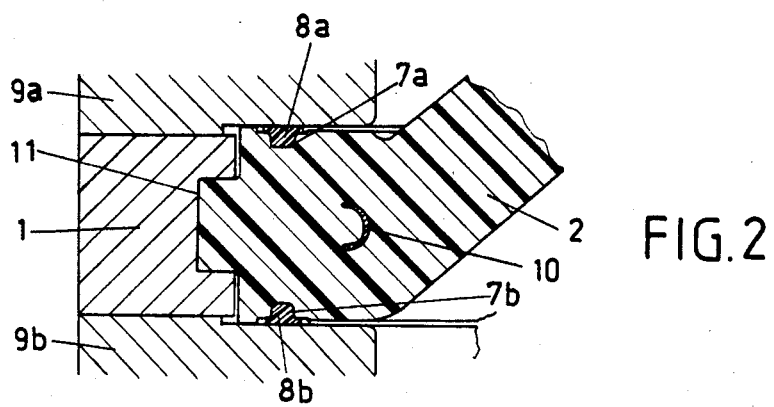
FIG. 2 shows an enlarged view of a section along line II—II in FIG. 1, portions of the enclosure which adjoin the disc-type insulator being also indicated.
Figure 3:
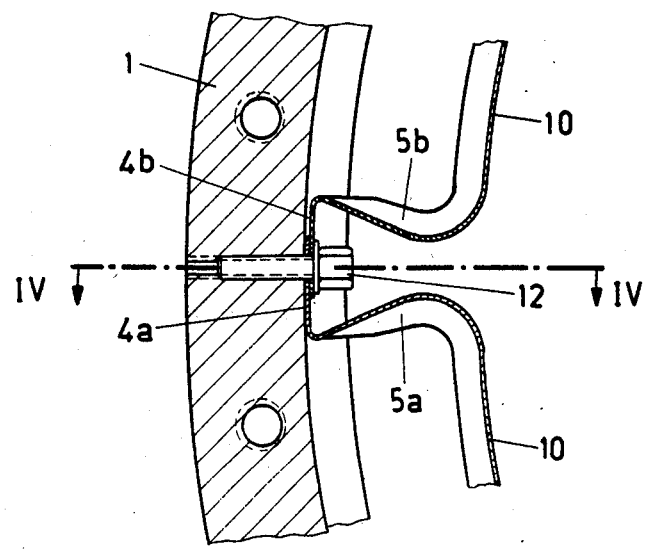
FIG. 3 shows a joint between two electrode segments, by depicting a section through the mid-plane of the mounting ring and of the cast-in electrode.
Figure 4:
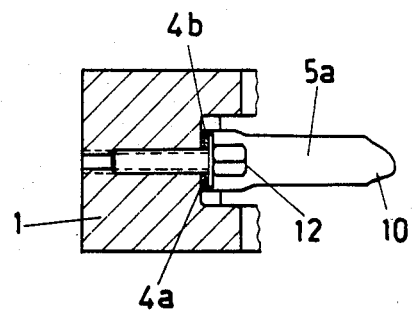
FIG. 4 shows a section through a joint of the type shown in FIG. 3, along the line IV—IV.

The figures illustrate a disc-type insulator 2 which is surrounded by a metal mounting ring 1. This disc-type insulator 2 is configured basically as a disc-shaped or conical body, made, for example, of epoxy resin containing an inorganic filler. The body contains a convex-cambered cast-in electrode 3 which is connected to contact electrodes 4a, 4b, via contact tongues 5a, 5b, in a manner such that the connection conducts electricity. The contact electrodes 4a, 4b bear against the mounting ring 1. In the center, the disc-type insulator 2 contains a metal inner fitting 6, which can be surrounded by a second cast-in electrode (not shown). In addition, the disc-type insulator 2 possesses, on each side, a peripheral groove 7a, 7b for a sealing ring 8a, 8b, which is located, on each side, between the disc-type insulator 1 and an adjoining portion 9a, 9b of the enclosure when the disc-type insulator is in the installed condition (FIG. 2).

According to the invention, the cast-in electrode 3 is subdivided into a plurality of electrode segments 10. The contact tongues 5a, 5b, which connect them to the contact electrodes 4a, 4b, are bent, preferably into an "S" shape. In a manner which is particularly advantageous with regard to mechanical strength and simplicity of manufacture, each electrode segment 10 possesses a contact tongue 5a, 5b at each end, which is formed by prolongations (lengthening) of the electrode segment 10, which are bent over towards the edge surface 11 of the disc-type insulator 2. The contact electrodes 4a, 4b bear against the edge surface 11 of the disc-type insulator 2 and, in turn, are formed by prolongations of the contact tongues 5a, 5b. Contact electrodes 4b, 4a which are connected to the oppsitely-located ends of electrode segments 10 which follow one another in the peripheral direction are, in each case, superimposed and are jointly fastened to the mounting ring, for instance by means of a screw 12. This means of fastening very secure and, at the same time, can be effected with only a small expenditure of labor. In order to increase the flexibility of the electrode, the contact tongues 5a, 5b can also, if required, be designed to be narrower than the electrode segments 10. The most suitable material for the electrode segments 10, the contact tongues 5a, 5b, and the contact electrodes 4a, 4b is sheet aluminum, which can be provided with perforations in order to save material and weight, and also to increase its flexibility. A better bond between the electrode segments 10 and the insulating material which surrounds them is also obtained.

During the manufacture of the disc-type insulator according to the invention, the electrode segments 10 can be fixed inside the casting mould in simple manner, prior to the casting operation, by fastening them to the casting mould by means of contact electrodes 4a, 4b to which they are connected. The high flexibility of the electrode segments 10, and of the contact tongues 5a, 5b, which enables the disc-type insulator 2 to cure without this fastening being released, enables a disc-type insulator according to the invention to be manufactured in the above manner, with a mounting ring 1, even when the ring forms a portion of the casting mould and the contact electrodes 4a, 4b are fastened to it in the manner described above.

It is possible to manufacture each electrode segment together with the contact tongues and contact electrodes connected thereto, in a simple and inexpensive manner, by bending a single continuous metal part.

I claim:

1. An insulator for a high-voltage cable of the type in which a central conductor is supported by said insulator along the axis of an axially elongated, gas-filled outer enclosure, said insulator comprising:
   (a) an insulator body symmetrically disposed around a longitudinal axis and having a central opening for accommodating a central conductor and an outer periphery which is shaped to fit the interior of an outer enclosure; and
   (b) an electrode embedded within said insulator body and symmetrically encircling said axis of said insulator body, said electrode being disposed closely adjacent one of the periphery of said central opening or said outer periphery of said insulator body and serving to limit the occurrence of corona discharge over the surface of said insulator body, said electrode comprising:
      (1) a plurality of serially arranged elongated electrode segments which are disposed in a path following said one of said peripheries of said insulator body, each segment being electrically coupled to its respective adjacent segment; and
      (2) at least one radially extending contact tongue for each of said segments which extends towards said one of said peripheries to allow said electrode to be electrically accessible exteriorly of said one of said peripheries.

2. An insulator as in claim 1, wherein each of said plurality of electrode segments is curved so that said segment is longitudinally flexible and less prone to be damaged during shrinkage or expansion of said insulator body.

3. An insulator as in claim 1, wherein each of said at least one contact tongues includes an integral extension from its respective segment, each of said contact tongues extending toward said at least one of said peripheries and wherein each of said segments further comprises respective contact electrodes extending from said contact tongues and disposed generally in a plane which is parallel to one of said peripheries of said insulator body.

4. An insulator as in claim 3, wherein said at least one contact tongue of each of said segments includes first and second contact tongues extending from the opposite respective ends of each of said segments.

5. An insulator as in claim 3, further comprising a metal mounting ring surrounding said outer periphery of said insulator body and wherein adjacently located ones of said electrode contacts are superimposed over each other and are fastened to said mounting ring.

6. An insulator as in claim 1, wherein said electrode is disposed adjacent said outer periphery of said insulator body.

7. An insulator as in claim 1, wherein each of said at least one contact tongues is generally "S" shaped as it extends from its respective said segment.

8. An insulator as in claim 1, wherein the major width of each of said at least one contact tongues in a direction perpendicular to said axis of said insulator body is narrower than the corresponding width of said electrode segments.

9. An insulator according to claim 1, wherein said electrode segments are composed of perforated aluminum sheet metal.

10. A method for manufacturing a cast insulator for a high-voltage cable, said method comprising the steps of:
   (a) forming a plurality of elongated electrode segments to have an integral contact tongue and an integral electrode contact extending therefrom, said contact tongue being formed by bending a portion of said segment reentrantly, said electrode contact being formed by bending a portion of said contact tongue so that said electrode contact is disposed in a plane spaced from and substantially parallel to the plane containing said segment;
   (b) arranging said electrode segments serially in a casting mold adjacent one another in a path following a periphery of said mold and being oriented such that said contact tongue is generally perpendicular to said periphery and said contact electrode is parallel to said periphery;
   (c) securing said electrode segments to said periphery of said mold, said segments being secured to said periphery adjacent said electrode contacts;

(d) filling said mold with a castable insulating material; and
(e) curing said material.

11. A method for manufacturing a cast insulator for a high-voltage cable, said method comprising the steps of:
(a) forming a plurality of elongated electrode segments to have an integral contact tongue and an integral electrode contact extending therefrom, said contact tongue being formed by bending a portion of said segment reentrantly, said electrode contact being formed by bending a portion of said contact tongue so that said electrode contact is disposed in a plane spaced from and substantially parallel to the plane containing said segment;
(b) arranging said electrode segments serially in a casting mold adjacent one another in a path following a periphery of said mold and being oriented such that said contact tongue is generally perpendicular to said periphery and said contact electrode is parallel to said periphery;
(c) placing a mounting ring between said periphery of said mold and said plurality of electrode segments;
(d) securing said segments to said mounting ring;
(e) filling said mold with a castable insulating material; and
(f) curing said material.

* * * * *